H. JACOB.
OCULAR PRISM FOR BASE LINE TELEMETERS.
APPLICATION FILED NOV. 10, 1908.
934,440.
Patented Sept. 21, 1909.
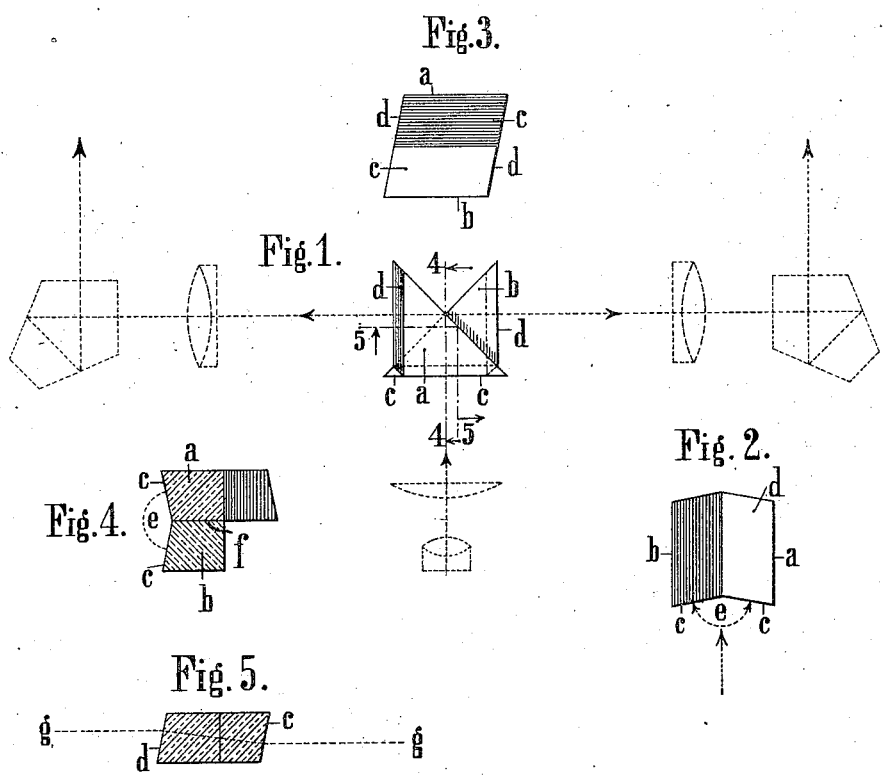

UNITED STATES PATENT OFFICE.

HEINRICH JACOB, OF STEGLITZ, NEAR BERLIN, GERMANY, ASSIGNOR TO THE FIRM OF OPTISCHE ANSTALT C. P. GOERZ AKTIENGESELLSCHAFT, OF FRIEDENAU, NEAR BERLIN, GERMANY.

OCULAR PRISM FOR BASE-LINE TELEMETERS.

934,440.  Specification of Letters Patent.  Patented Sept. 21, 1909.

Application filed November 10, 1908. Serial No. 461,863.

*To all whom it may concern:*

Be it known that I, HEINRICH JACOB, a citizen of the German Empire, residing at 32ª Holsteinischestrasse, Steglitz, near Berlin, Germany, engineer, have invented certain new and useful Improvements in Ocular Prisms for Base-Line Telemeters, of which the following is a specification.

My present invention relates to an ocular prism for base-line telemeters consisting of two substantially rectangular prisms superposed one upon the other with crossed hypotenuse surfaces. In the case of cross-prisms of this kind which oppose to the ocular a dividing edge formed by one cathetus edge of each of the two cross-prisms there arises, in known constructions, the disadvantage that the dividing line does not appear sharp in the image since when the eye is raised or lowered, more or less by portions of the prism surfaces adjacent the line become visible, owing to the fact that the rays passing through the prisms parallel to the telescope axis traverse the cross-prism without refraction, so that they travel along the contact surfaces of the two individual prisms forming the cross-prism. This renders it possible, as mentioned, for the eye of the observer, when looking in an inclined direction, to see also the contact surface of the two prisms, which becomes perceptible as a shadowy extension beside the sharp dividing line. This disadvantage of the known cross-prisms is, according to the present invention, obviated thereby that the cathetus surfaces facing the ocular and belonging to the two individual prisms forming the cross-prism are inclined to the telescope axis in such a manner that they form with each other a reëntering angle, that is to say, that the dividing line is farther from the ocular than the upper and lower edges of the cathetus surfaces facing the eye.

The inclined position of the front cathetus surfaces relatively to the telescope axis necessitates compensation by giving the lateral cathetus surfaces corresponding inclination, in order that the inclination of the cathetus surfaces facing the ocular may not cause color dispersion. The inclination of the lateral cathetus surfaces must be such that the section lines of the two cathetus surfaces of each prism are parallel to each other in the extended angle section, so that each of the two individual prisms forming the cross-prism is equivalent in its effect to an inclined plane-parallel plate.

The new prism arrangement is illustrated in the annexed drawing in which—

Figure 1 is a plan of the cross-prism, the other optical elements of a telemeter being diagrammatically indicated in this figure by dotted lines. Fig. 2 is a side elevation of the cross-prism looking toward the right and Fig. 3 is a front elevation. Fig. 4 is a vertical section of the cross-prism, on the line 4—4 of Fig. 1. Fig. 5 is an extended angle section of one of the two prisms on the broken line 5—5 of Fig. 1.

In the drawing the two prisms are designated $a$ and $b$. The two cathetus surfaces of each of the two prisms are marked $c$ and $d$. The two cathetus surfaces are, as shown more particularly in Fig. 4, inclined to the direction of the axis of the telescope so that they make the reëntering angle $e$. The lateral cathetus surfaces $d$ of the two prisms are also inclined relatively to the contact surface $f$ of the two prisms $a$ $b$ and make with this surface an angle of such size that in the extended angle section according to Fig. 5 the two section edges through the cathetus surfaces $c$ $d$ are parallel, so that in this angle section the image of a plane-parallel glass plate appears with entrance and exit surfaces inclined to the ray $g$, which is parallel with the axis.

The effect of the new cross-prism by which the shadow behind the dividing line $e$ is prevented arises from the fact that an axially parallel ray, traced back from the ocular to the object, does not pass along the contact surface $f$ of the two prisms but deviates therefrom, by reason of the inclined position of the cathetus surfaces $c$ facing the ocular. Raising or lowering the eye within the limits involved cannot bring into view portions of the contact-surfaces of the two prisms adjacent the dividing line.

What I claim is:

1. Ocular prism for base-line telemeters, consisting of two substantially rectangular prisms the hypotenuse surfaces of which cross each other, and one edge of one cathetus surface of each rectangular prism abutting against one edge of one cathetus surface of the second rectangular prism, said cathetus surfaces with abutting edges being so inclined to the contact surface of the two prisms that they form a reëntering angle.

2. Ocular prism for base-line telemeters, consisting of two substantially rectangular prisms the hypotenuse surfaces of which cross each other, and one edge of one cathetus surface of each rectangular prism abutting against one edge of one cathetus surface of the second rectangular prism, said cathetus surfaces with abutting edges being so inclined to the contact surface of the two prisms that they form a reëntering angle and the second cathetus surface of each of the two rectangular prisms forming the ocular prism having the same inclination relatively to the contact surfaces of the individual prisms as said first named cathetus surfaces with abutting edges so that each of the prisms gives, in an extended angle section, the image of an inclined plane-parallel plate.

In testimony whereof I have signed this specification in the presence of two subscribing witnesses.

HEINRICH JACOB.

Witnesses:
 HENRY HASPER,
 WOLDEMAR HAUPT.